United States Patent [19]
Izumi et al.

[11] Patent Number: 4,535,855
[45] Date of Patent: Aug. 20, 1985

[54] ARTICLE DISCHARGE APPARATUS AND METHOD IN AUTOMATIC WEIGHING SYSTEM

[75] Inventors: Asashiro Izumi, Kusatsu; Yoshiharu Mikami; Seiji Yamada, both of Kyoto, all of Japan

[73] Assignee: Kabushiki Kaisha Ishida Koki Seisakusho, Kyoto, Japan

[21] Appl. No.: 566,879

[22] Filed: Dec. 29, 1983

[30] Foreign Application Priority Data

Dec. 29, 1982 [JP] Japan ................. 57-234380
Jan. 28, 1983 [JP] Japan ................. 58-13053

[51] Int. Cl.³ .......................... G01G 19/22
[52] U.S. Cl. .......................... 177/1; 177/59
[58] Field of Search ............... 177/1, 25, 50, DIG. 12, 177/59

[56] References Cited

U.S. PATENT DOCUMENTS 4,344,492 8/1982 Hirano .
4,385,671 5/1983 Hirano ..................... 177/25
4,398,614 8/1983 Kakita et al. ............. 177/25
4,399,880 8/1983 Konishi .................... 177/1

FOREIGN PATENT DOCUMENTS 0052498 5/1982 European Pat. Off. .
3121454 3/1982 Fed. Rep. of Germany .
56-126719 5/1981 Japan ..................... 177/1
2085172 4/1982 United Kingdom .

Primary Examiner—E. A. Goldberg
Assistant Examiner—Frederick L. Kampe
Attorney, Agent, or Firm—Staas & Halsey

[57] ABSTRACT

In an apparatus and method for discharging weighed articles in a combinatorial weighing system, weighed articles discharged from a plurality of weighing hoppers are selectively released into first and second collecting routes of a collecting chute. The outlet of each collecting route is provided with a timing hopper having a gate. The gates of the two timing hoppers are opened and closed by respective drive units. The arrangement is such that one of the gates can be opened while the other gate is in the closed state or by the time the other gate is completely closed. Control is effected in such a manner that when weighed articles are released into one of the collecting routes from the weighing hoppers, the timing hopper corresponding to this collecting route is opened to completely discharge weighed articles previously released into the timing hopper. The discharge of previously released weighed articles is accomplished during the time needed for the weighed articles just released to reach the timing hopper.

10 Claims, 13 Drawing Figures

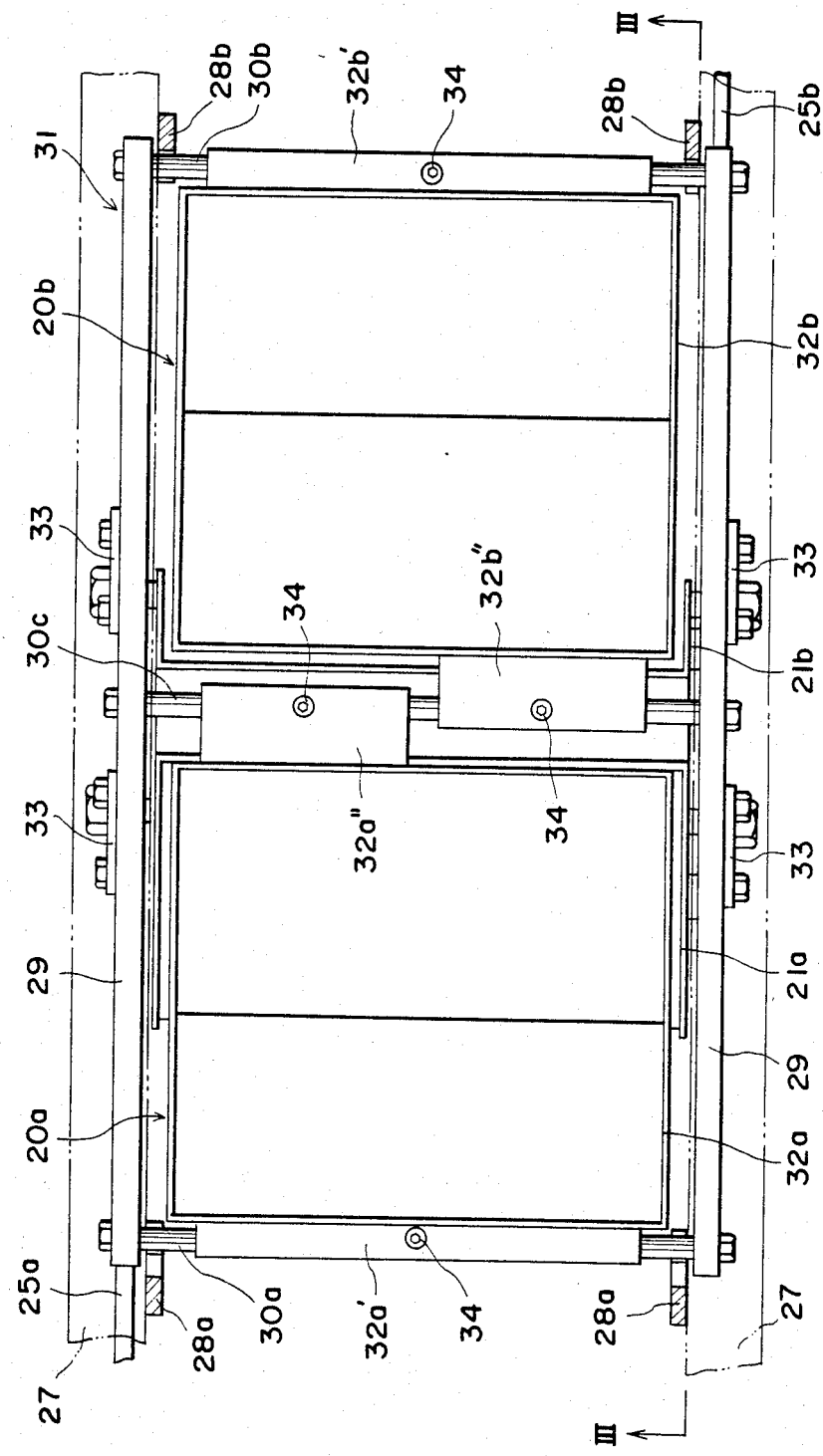

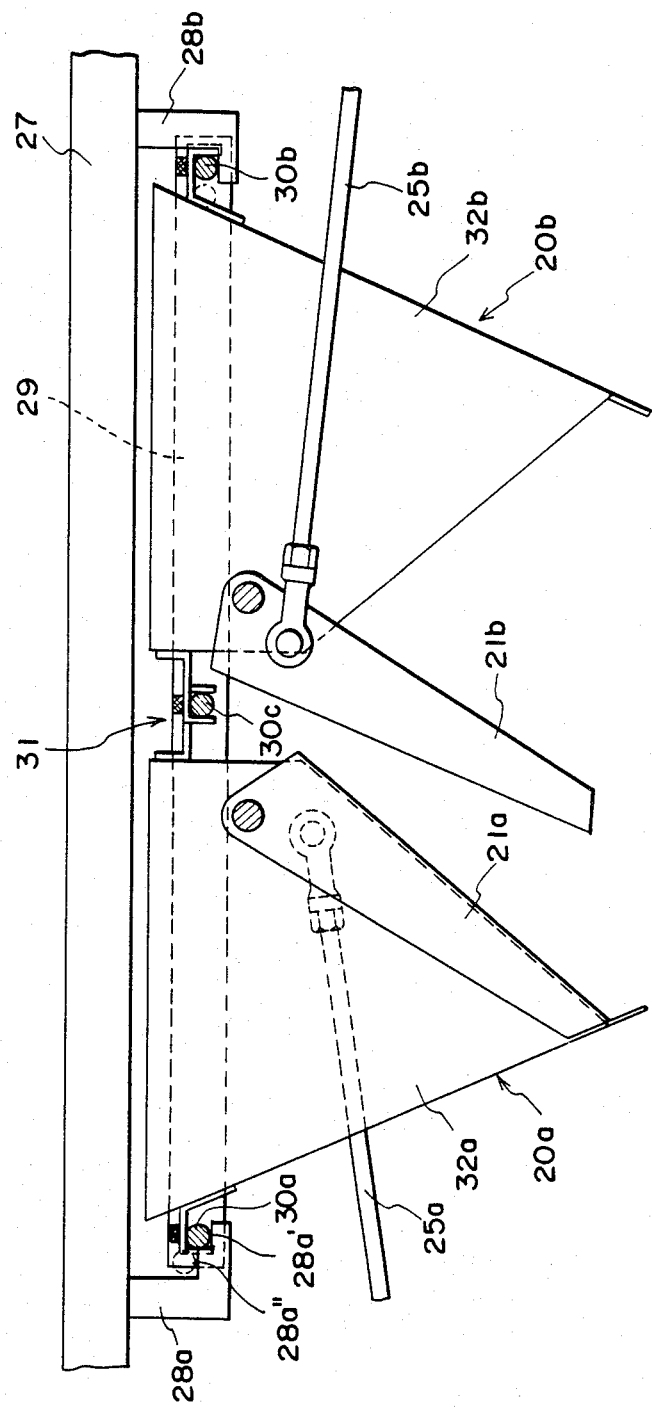

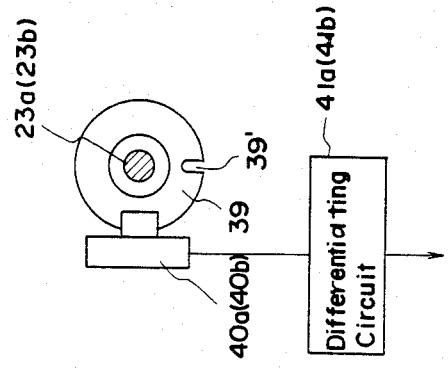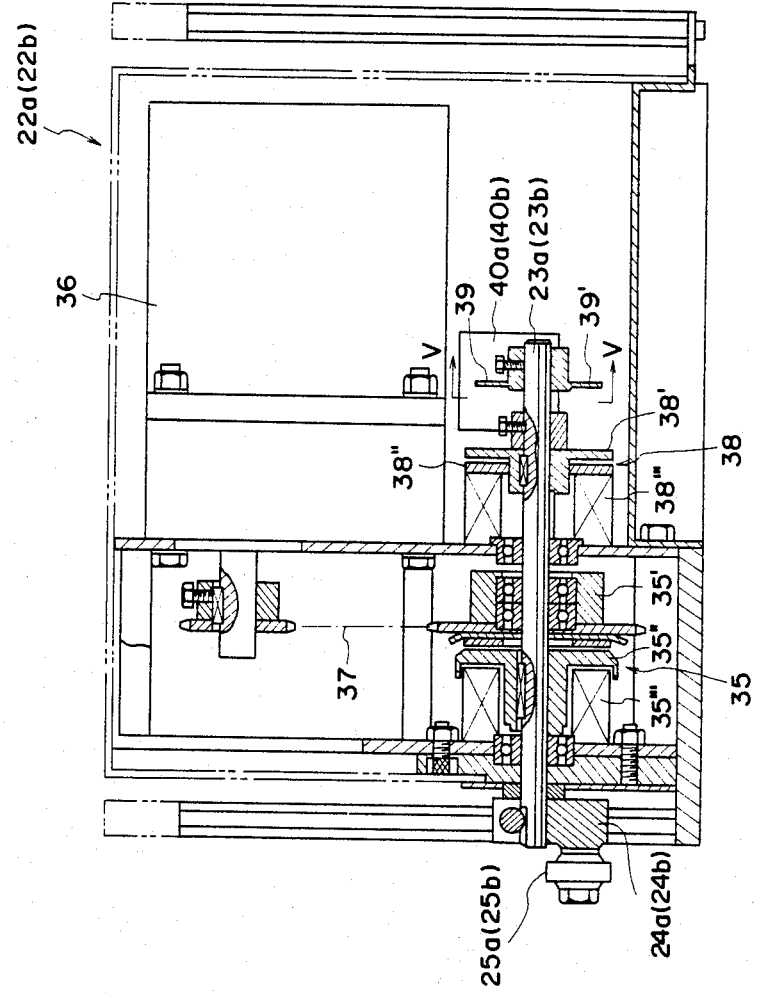

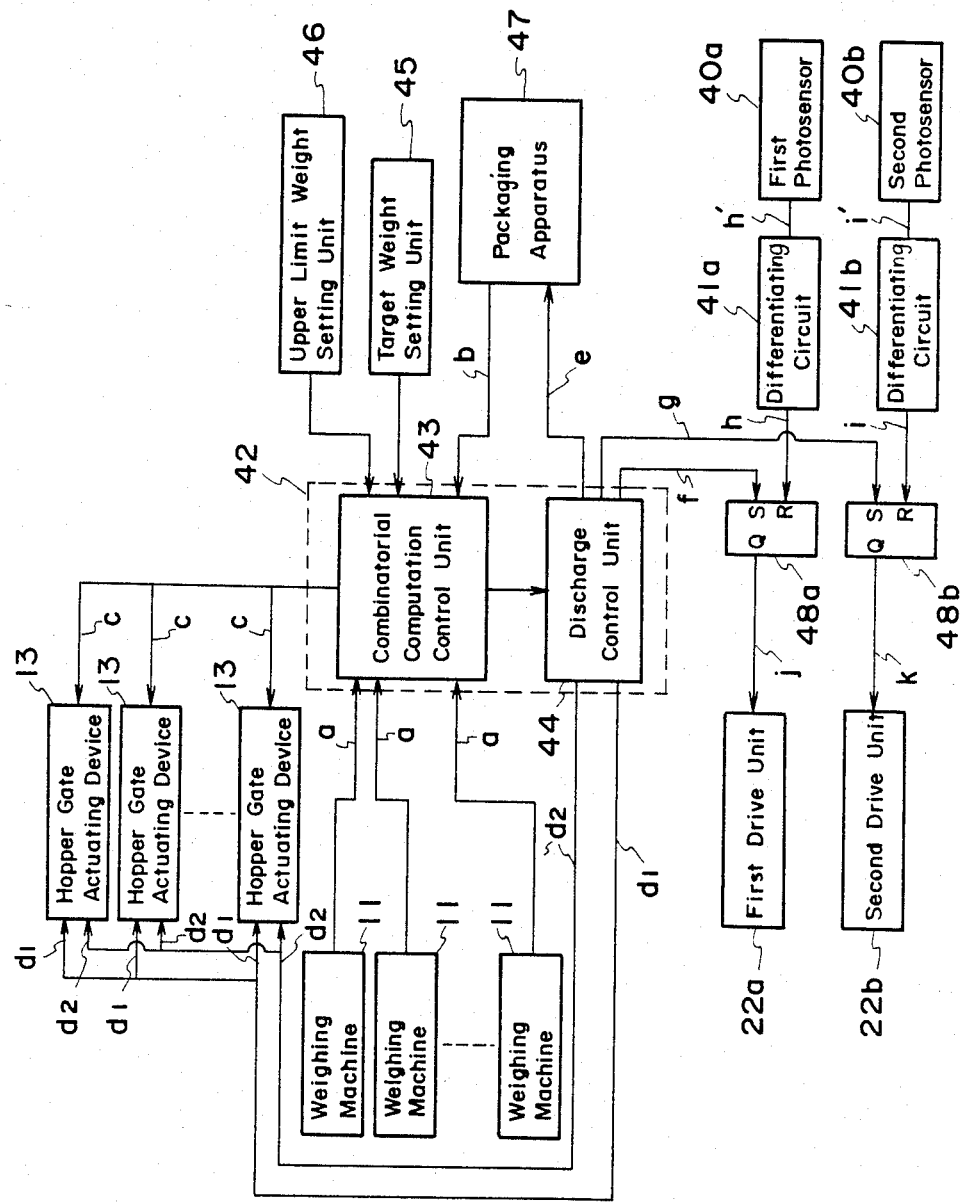

ARTICLE DISCHARGE APPARATUS AND METHOD IN AUTOMATIC WEIGHING SYSTEM

BACKGROUND OF THE INVENTION

This invention relates to an apparatus for discharging weighed articles in a combinatorial weighing-type automatic weighing system, and to a method of discharging the articles.

An automatic weighing system now in practical use operates by supplying articles to a plurality of weighing machines, computing combinations of weight values obtained from the weighing machines, selecting a combination of the weight values the sum total whereof is equal to a predetermined target weight or closest to the target weight, and discharging only the articles contained in the weighing machines corresponding to the selected combination (referred to as the "optimum combination"), whereby there is obtained a batch of the articles the weight whereof is equal or closest to the target weight.

The automatic weighing system of the type described is equipped with a collecting chute underlying the weighing machines for collecting the articles discharged from the weighing machines corresponding to the optimum combination, and is arranged so that the articles which have been weighed out are supplied from the collecting chute to a packaging apparatus used in conjunction with the weighing system. With such an arrangement, it is required that the automatic weighing system be operated in coordination with the packaging apparatus. More specifically, the interval between weighing cycles performed by the automatic weighing system must be controlled in such a manner that the articles are discharged from the collecting chute in conformance with the packaging apparatus' processing time.

When the weighing operation of the automatic weighing system is speeded up to accommodate an increase in the processing capability of the packaging apparatus, the interval between discharge cycles for the discharge of articles from the weighing machines into the collecting chute is shortened. This means that when one batch of the articles has been discharged into the collecting chute, the next batch will follow shortly thereafter, so that the discharged article batches mix within the chute or, worse, enter the chute in continuous fashion, making it difficult or impossible for the packaging apparatus supplied with the articles to package them into discrete quantities. This places a limitation on the extent to which the processing capability of the overall system can be improved.

An alternative arrangement aimed at solving this problem is to steepen the incline of the collecting chute walls along which the articles slide in order to hasten the rate at which the articles pass through the chute. The inevitable result of this expedient, however, is to enlarge the vertical dimension of the collecting chute and, hence, the overall height of the weighing system.

Another proposal is to provide the weighing hopper of each weighing machine with first and second gates, and provide the collecting chute with a first collecting route for receiving the articles discharged from each weighing hopper when its first gate is opened, and a second collecting route for receiving articles discharged from each weighing hopper when its second gate is opened, with the articles being introduced into the two routes in alternating fashion. This permits the article batches to be supplied to the packaging apparatus intermittently without the mixing of successively discharged batches. However, even with this arrangement, the articles scatter while sliding down along the interior of the collecting chute, so that a certain amount of time is required from the beginning to the end of the discharge in each collecting route. Hence, there is the danger that the article batches in the two routes will mix at the point where they connect with the packaging apparatus. As a result, the time interval between discharges from the weighing machines to the collecting chute cannot be shortened sufficiently. In such case, a packaging apparatus may be provided for each of the two collecting routes, or a single packaging apparatus having dual packaging functions, one for each collecting route, may be provided. However, either expedient raises equipment costs by a wide margin.

SUMMARY OF THE INVENTION

An object of the present invention is to raise the processing efficiency of the overall weighing system by shortening the time needed to introduce articles into the packaging apparatus as well as the stand-by time of the packaging apparatus.

Another object of the present invention is to shorten greatly the time interval between the operations for supplying the packaging apparatus with articles by performing the article discharge alternately between first and second collecting routes, wherein the capability of a single packaging apparatus having but a single processing system can be utilized to the maximum degree to raise the overall weighing and packaging performance even though the packaging apparatus is used in combination with the automatic weighing system having two discharge routes.

According to the present invention, which pertains to the discharging of weighed articles in an automatic weighing sysem, weighed articles discharged from a plurality of weighing hoppers are alternately released into first and second collecting routes of a collecting chute, the outlet of each collecting route being provided with a timing hopper having a gate. First and second drive units are provided for opening and closing the gates of respective timing hoppers, with the arrangement being such that one of the gates can be opened while the other gate is in the closed state or by the time the other gate is completely closed. Control is effected in such a manner that when weighed articles are released into one of the collecting routes from the weighing hoppers, the timing hopper corresponding to this collecting route is opened to completely discharge weighed articles previously released into the timing hopper, this being accomplished during the time needed for the weighed articles just released to reach the timing hopper.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is an enlarged transverse sectional view taken along line II—II of FIG. 1 and showing a timing hopper and associated parts;

FIG. 3 is a longitudinal sectional view taken along line III of FIG. 2;

FIG. 4 is an enlarged longitudinal sectional view taken along line IV—IV of FIG. 1;

FIG. 5 is a longitudinal sectional view taken along line V—V of FIG. 4;

FIG. 6 is a block diagram of a first embodiment of a control apparatus;

DESCRIPTION OF THE PREFERRED EMBODIMENTS

Reference will now be had to the accompanying drawings to describe the present invention.

Figure 1:
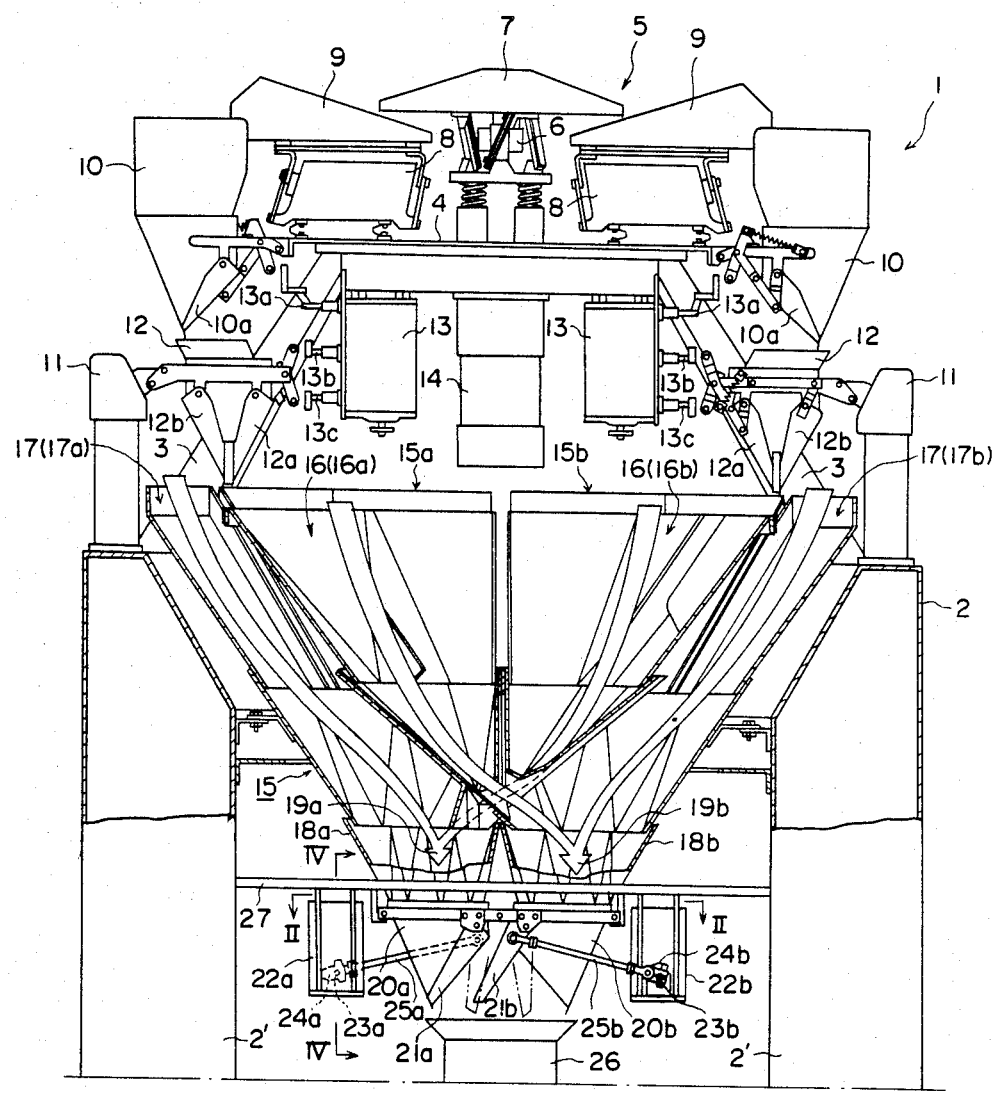
FIG. 1 is a longitudinal sectional side view showing a weighing system in its entirety.

With reference to FIG. 1, numeral 1 denotes the main body of a weighing system, and numeral 2 denotes a base for supporting the main body 1. A supporting platform 4 is supported above the base 2 at the central portion thereof by a plurality of support legs 3 . . . 3 the lower ends of which are affixed to the base. Provided on the supporting platform 4 is a feeding unit 5 for feeding articles in distributive fashion. The feeding unit 5 includes a dispersing table 7 mounted centrally on the supporting platform 4 through a vibrator 6, a plurality of radially extending supply troughs 9 . . . 9 mounted on the supporting platform 4 through respective vibrators 8 . . . 8, the inner end of each supply trough 9 underlying the periphery of the dispersing table 7, and pool hoppers 10 . . . 10, equal in number to the supply troughs, attached to the periphery of the supporting platform 4 so as to underlie the outer ends of corresponding ones of the supply troughs 9 . . . 9. Weighing machines 11 . . . 11, equal in number to the pool hoppers 10 . . . 10, are disposed in a circular array on the base 2. A weighing hopper 12 is attached to each weighing machine 11, the weighing hoppers 12 . . . 12 being situated below corresponding ones of the pool hoppers 10 . . . 10. Each pool hopper 10 is equipped with a single gate 10a for charging articles, contained in the hopper, into the underlying weighing hopper 12. Each weighing hopper 12 is equipped with two gates, namely an inwardly opening gate 12a and an outwardly opening gate 12b, where "inwardly" means toward the center of the weighing system main body and "outwardly" means away from the center. A hopper gate actuating device 13 is provided for each cooperating pair of pool hoppers 10 and weighing hoppers 12, the latter underlying the former as mentioned above. Numeral 14 designates a motor for operating each of the actuating devices 13 . . . 13. The hopper gate actuating devices 13 . . . 13 and motor 14 depend from the underside of the supporting platform 4. Each actuating device 13 is equipped with push-rods 13a, 13b, 13c. When thrust outwardly, the push-rod 13a opens the gate 10a of the pool hopper 10, and the push-rods 13b, 13c open the gates 12a, 12b, respectively, of the weighing hopper 12.

Numeral 15 denotes a collecting chute fitted on the base 2 below the array of weighing hoppers 12 . . . 12. The upper part of the collecting chute 15 is provided with a substantially circular inner receiving portion 16 defining a substantially circular opening for receiving weighed articles discharged from the inwardly opening gates 12a . . . 12a of the weighing hoppers 12 . . . 12, and with an annular outer receiving portion 17 defining a substantially annular opening around the outer periphery of the inner receiving portion 16, for receiving weighed articles discharged from the outer opening gates 12b . . . 12b of the weighing hoppers 12 . . . 12. The lower part of the collecting chute 15 is provided with two discharge chutes 18a, 18b. In the illustrated embodiment, the collecting chute 15 is divided into right and left sections 15a, 15b, and first and second collecting routes 19a, 19b are provided within the collecting chute 15. The first collecting route 19a, which extends into the left discharge chute 18a, is composed of merging outer and inner receiving portions 17a, 16b of the left and right sections 15b, 15b, respectively. The second collecting route 19b, which extends into the right discharge chute 18b is composed of merging inner and outer receiving portions 16a, 17b of the left and right sections 15b, 15b, respectively.

Numerals 20a, 20b denote a pair of first and second timing hoppers, respectively, provided below the respective discharge chutes 18a, 18b. The first and second timing hoppers 20a, 20b are provided with gates 21a, 21b, respectively, on the side of the hoppers that confront each other. Also provided are first and second drive units 22a, 22b for actuating the gates 21a, 21b, respectively. Crank arms 24a, 24b, which are secured to rotary shafts 23a, 23b of the drive units 22a, 22b, respectively, are connected with the respective gates 21a, 21b by respective drive rods 25a, 25b. With such an arrangement, the gates 21a, 21b can be opened and closed by the cranking motion of the corresponding drive rods 25a, 25b as the rotary shafts 23a, 23b rotate. Numeral 26 designates an inlet to a packaging apparatus for receiving articles discharged by the first and second timing hoppers 20a, 20b.

The structure for supporting the hoppers 20a, 20b and gates 21a, 21b is as shown in FIGS. 1 through 3. A pair of mounting bars 27, 27 are provided in parallel astride left and right leg portions 2', 2' of the base 2. Secured astride the bars 27, 27 are opposing L-shaped hanger members 28a, 28b. A support frame 31 comprises a pair of parallel side plates 29, 29, shafts 30a, 30b spanning the side plates 29, 29 at the left and right ends thereof, and a shaft 30c spanning the side plates 29, 29 at the center thereof. The support frame 31 having this construction is hung at the four corners thereof from the hanger members 28a, 28b. The first timing hopper 20a has a main body 32a, the upper portion of which is provided with hanger pieces 32a', 32a" by which the main body 32a is hung from the left and central shafts 30a, 30c of the frame 31. Similarly, the second timing hopper 20b has a main body 32b the upper portion of which is provided with hanger pieces 32b', 32b" by which the main body 32b is hung from the right and central shafts 30b, 30c of the frame 31. The gates 21a, 21b of the hoppers 20a, 20b, respectively, are pivotally supported by brackets 33, . . . 33 secured to the side plates 29, 29 of the support frame 31. As shown in FIG. 3, the left hanger member 28a is provided with a surface 28a' for receiving the left shaft 30a of the support frame 31, and an auxiliary surface 28a" at a level higher than that of the surface 28a'. When the shaft 30a is placed upon the auxiliary receiving surface 28a", as indicated by the broken line in FIG. 3, the right shaft 30b of the support frame 31 separates from the right hanger member 28b, also as shown by the broken line. The support frame 31 can thus be detached while the hoppers 20a, 20b remain suspended therefrom. The hanger pieces 32a', 32a", 32b', 32b" of the hopper main bodies 32a, 32b are secured to the corresponding shafts 30a, 30b, 30c by screws 34, . . . 34.

The construction of the first drive unit 22a, which is identical with that of the second drive unit 22b, will now be described with reference to FIG. 4. The rotary shaft 23a is provided with a clutch 35 comprising a drive member 35' fitted loosely on the shaft, a driven member 35" which rotates in unison with the shaft, and an electromagnetic coil 35'" which, when excited, couples the members 35', 35" together. When the clutch is engaged, the rotary shaft 23a is rotated by a motor 36 via a chain 37. The rotary shaft 23a is further provided with a brake 38 comprising a rotary member 38' which rotates in unison with the shaft, a fixed member 38" facing the rotary member 38', and an electromagnetic coil 38'" which, when excited, couples the members 38', 38" together. Applying the brake 38 forces the rotary shaft 23a to stop rotating. As shown in FIG. 5, a light-shielding disk 39 having a slit 39' at one portion thereof is secured to the rotary shaft 23a. Disposed at one side of the disk 39 is a first photosensor 40a comprising a light-emitting diode and a phototransistor. (The drive unit 22b corresponding to the second timing hopper 20b is equipped with a second photosensor 40b of the same construction.) When the slit 39' formed in the light-shielding disk 39 arrives at the position of the photosensor 40a (40b) due to rotation of the rotary shaft 23a (23b), the light beam from the light-emitting diode impinges upon the phototransistor, sending the output of the photosensor from the low to the high logic level. As a result, a differentiating circuit 41a(41b), which receives the output of the photosensor, produces an output pulse in response to which the clutch 35 is disengaged and the brake 38 applied. This brings the rotary shaft 23a (23b) to a stop. The arrangement is set in such a manner that the gate 21a (21b) of the corresponding hopper 20a (20b) will be closed when the slit 39' is stopped at the position of the photosensor 40a (40b).

A control apparatus for controlling the main body 1 of the weighing system as well as the first and second drive units 22a, 22b has the construction shown in FIG. 6. The control apparatus 42 comprises a combinatorial computation control unit 43 and a discharge control unit 44. Connected to the combinatorial control unit 43 is a target weight setting unit 45 and an upper limit weight setting unit 46. The combinatorial control unit 43 receives, as input signals, weight signals a, . . . a from the weighing machines 11, . . . 11 of the weighing system main body 1, and a timing signal b produced periodically by a packaging apparatus 47 used in combination with the weighing system. The combinatorial control unit 43 produces supply signals c, . . . c delivered to the hopper gate actuating devices 13, . . . 13 for opening the gates 10a, . . . 10a of the pool hoppers 10, . . . 10 corresponding to those weighing machines 11, . . . 11 which have been selected, as will be described below.

The discharge control unit 44 produces first and second control signals $d_1$, . . . $d_1$, $d_2$, . . . $d_2$ delivered to the hopper gate actuating devices 13, . . . 13 for opening the gates 12a, . . . 12a or 12b. . . 12b of the selected weighing hoppers 12, . . . 12, . . . , as well as a signal e delivered to the packaging apparatus 47 to indicate the completion of a discharge operation. The first discharge signals $d_1$, . . . $d_1$ open the gates corresponding to the first collecting route 19a of the weighing hoppers 12, . . . 12 belonging to the weighing machines 11, . . . 11. These are the gates corresponding to the outer and inner receiving portions 17a, 16b of the left and right sections 15b, 15b, respectively, of the collecting chute 15 shown in FIG. 1. The second discharge signals $d_2$, . . . $d_2$ open the gates corresponding to the second collecting route 19b of the weighing hoppers 12, . . . 12. These are the gates corresponding to the inner and outer receiving portions 16a, 17b of the left and right sections 15a, 15b, respectively, of the collecting chute 15 shown in FIG. 1. The discharge control unit 44 also produces setting signals f, g applied to respective first and second flip-flop circuits 48a, 48b. Applied to the first and second flip-flop circuits 48a, 48b as reset signals h, i are the pulse signals produced by the first and second photosensors 40a, 40b via the differentiating circuits 41a, 41b respectively. The first and second flip-flop circuits 48a, 48b produce first and second drive signals j, k to actuate the corresponding drive units 22a, 22b (namely the clutch 35) when the setting signals f, g arrive, and to stop the drive units 22a, 22b (i.e., disengage the clutch 35 and apply the brake 38) when the resetting signals h, i arrive.

Figure 7:
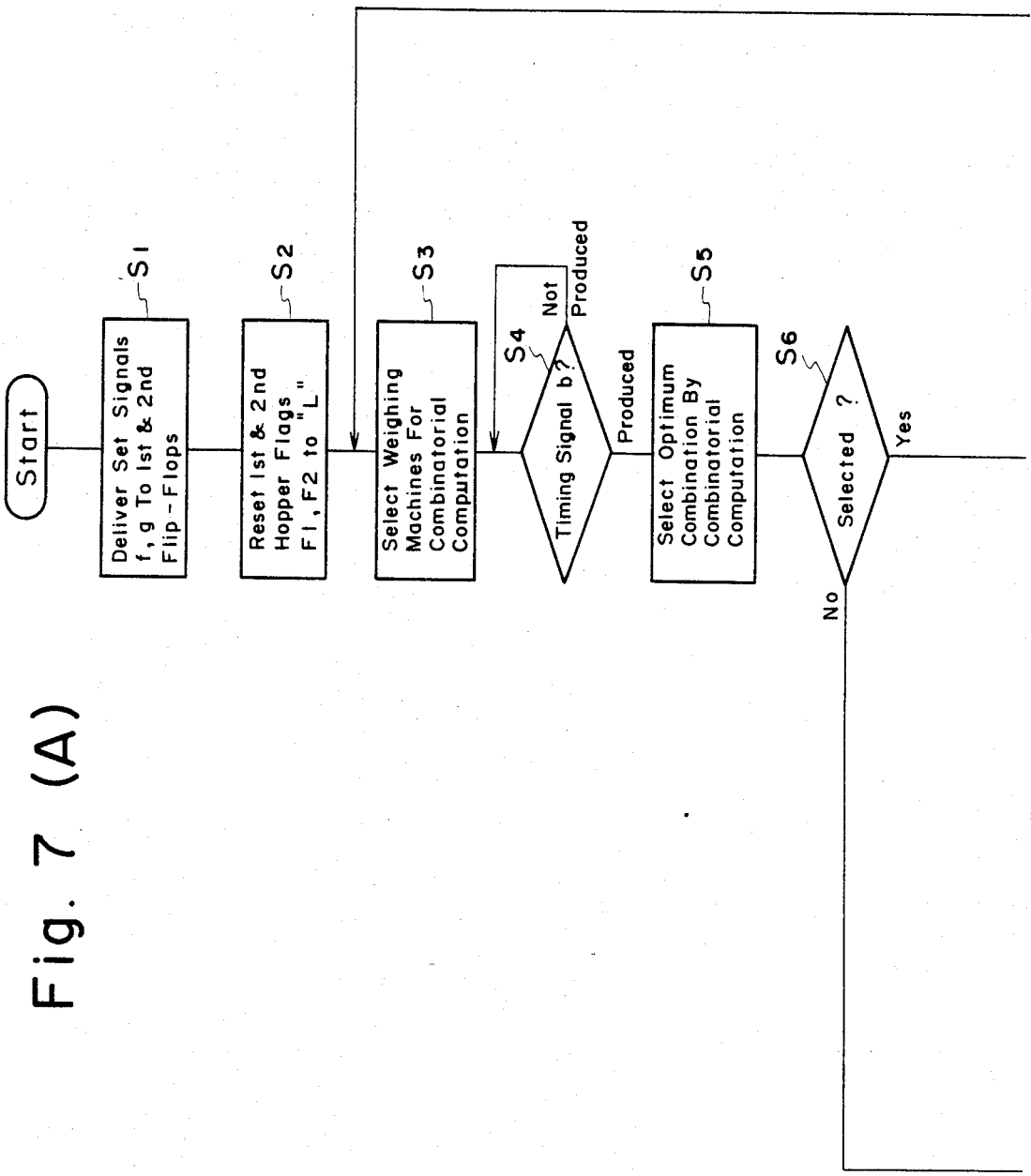
FIGS. 7 (including FIGS. 7(A), 7(B)) and 8 are a flowchart and timing chart respectively, illustrating an article discharge operation according to the first embodiment.
Figure 7:
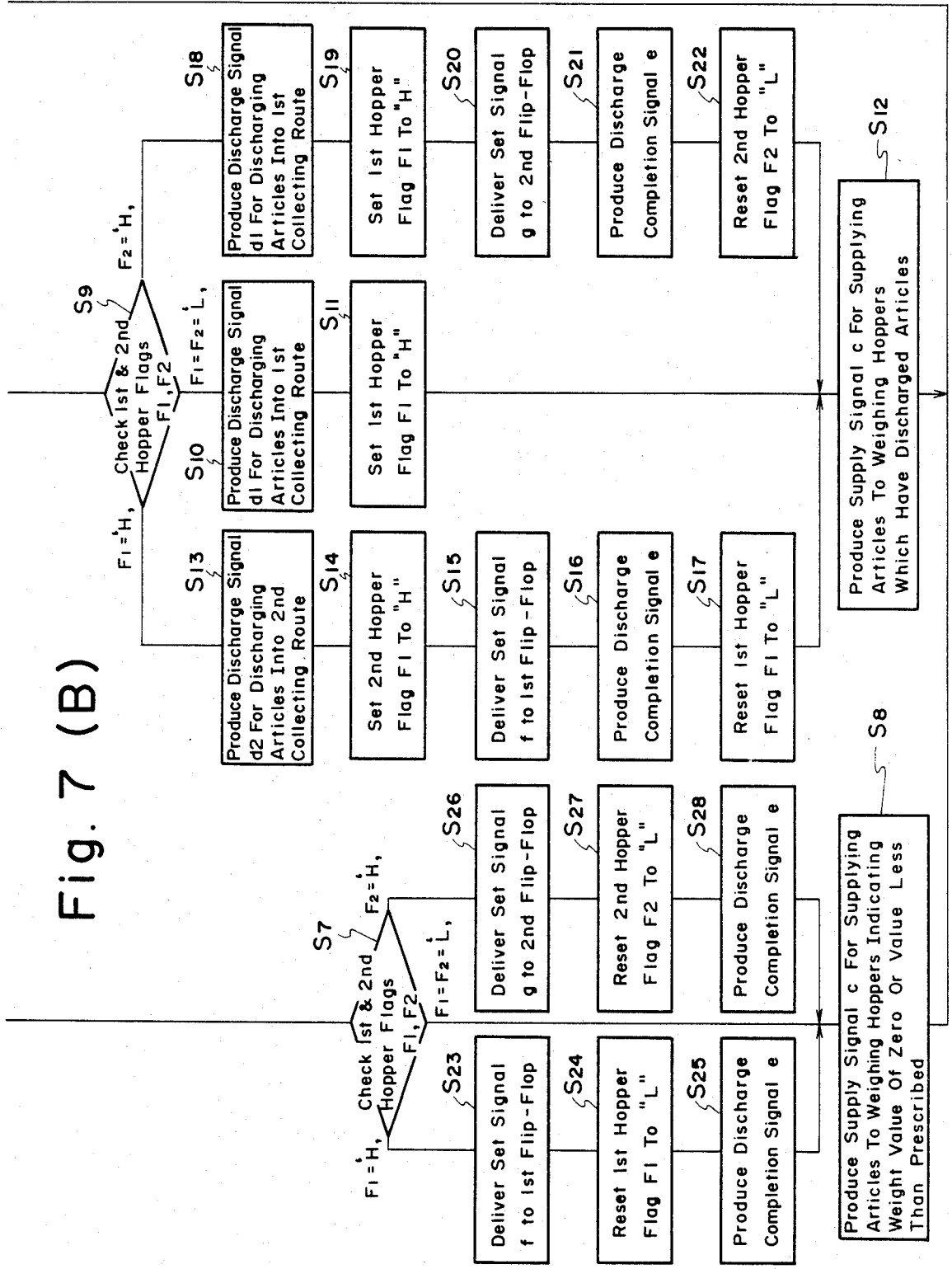
Figure 8:
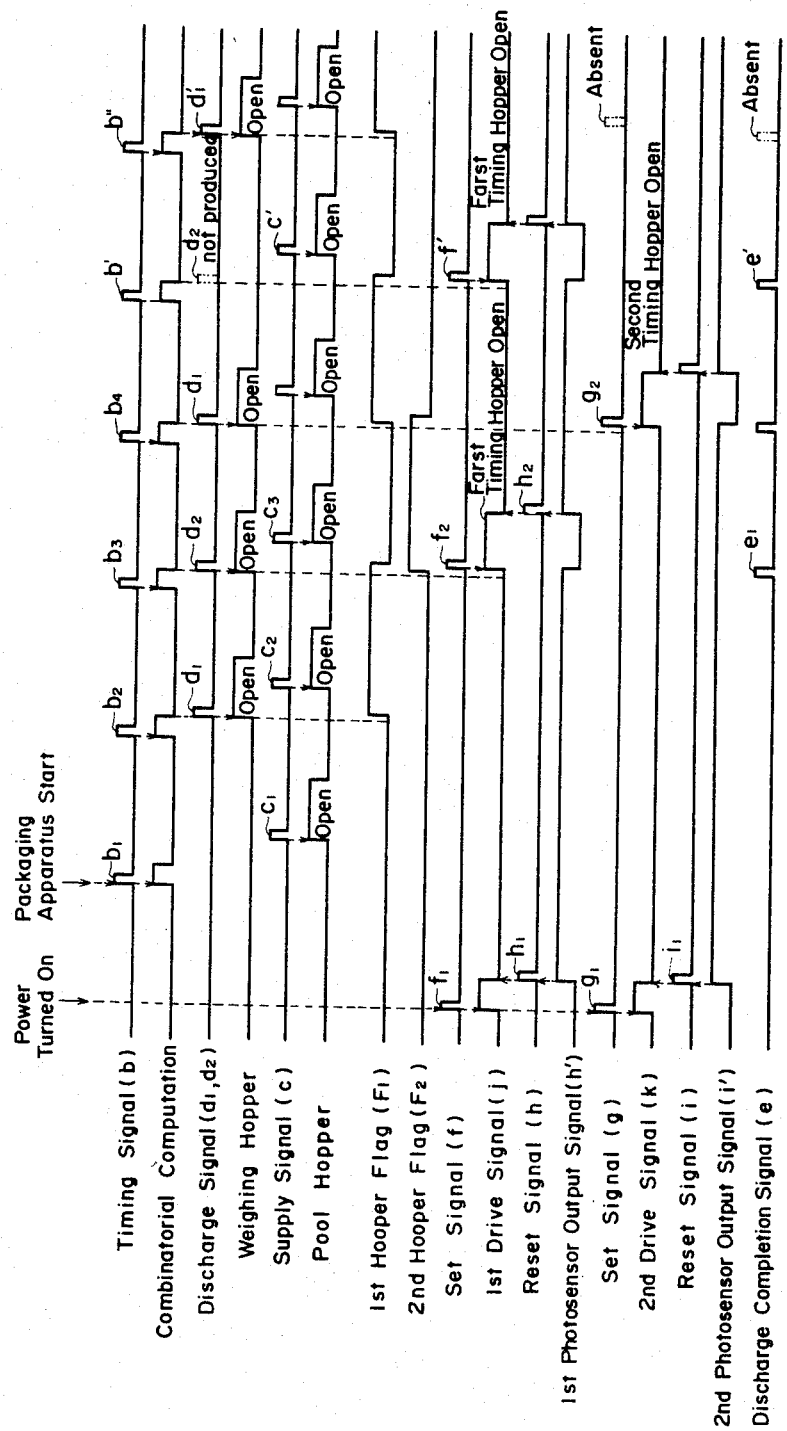

The operation of this embodiment of the present invention will now be described with reference to the flowchart of FIGS. 7(A) and 7(B) and the timing chart of FIG. 8.

First, when the weighing system is in the nonoperating state, the gates 21a, 21b of the first and second timing hoppers 20a, 20b hang vertically under their own weight, so that the slit 39' of the light-shielding disk 39 in the first and second drive units 22a, 22b is positioned downwardly, as depicted in FIG. 5. If power for operating the weighing system is now introduced, the discharge control unit 44 of the control apparatus shown in FIG. 6 delivers the setting signals f, g ($f_1$, $g_1$ in FIG. 8) to the first and second flip-flops 48a, 48b, respectively, which respond by producing the drive signals j, k for actuating the first and second drive units 22a, 22b, respectively, thereby rotating the rotary shafts 23a, 23b of the respective drive units. At the instant the gates 21a, 21b of the timing hoppers 20a, 20b close, the first and second photosensors 40a, 40b (through the differentiating circuits 41a, 41b) produce the reset signals h, i ($h_1$, $i_1$ in FIG. 8), thereby halting the operation of the drive units 22a, 22b simultaneously (step $S_1$ in FIG. 7). Though the signals h, i are pulse signals, the actual outputs h', i' of the respective photosensors 40a, 40b remain at the high (H) logic level until the light shielding disk 39 next begins rotating. Further, in the control apparatus 42, first and second hopper flags F1, F2 are reset to the low (L) logic level (step $S_2$). The first hopper flag F1 indicates, when high (H), that articles are present in the first timing hopper 20a and, when low (L), that no articles reside in the first timing hopper 20a. Similarly, the second hopper flag F2 indicates, when high (H), that articles are present in the second timing hopper 20b and, when low (L), that no articles reside in the second timing hopper 20b.

Thereafter, when the packaging apparatus 47 starts operating and produces the timing signal b ($b_1$ in FIG. 8) (step $S_4$), the combinatorial computation control unit 43 computes combinations (step $S_5$) based on weight signals a, . . . a from preselected (step $S_3$) weighing machines 11, . . . 11 and in light of the numerical values set in the target weight setting unit 45 and upper limit weight setting unit 46. At this point in time, however, no articles are present in the weighing hoppers 12, . . . 12, so an optimum combination is not obtained. In addition, the first and second hopper flags F1, F2 are at the low (L) level (steps $S_6$, $S_7$). Now the combinatorial computation control unit 43 supplies each hopper gate actuating device 13 with the supply signal c ($c_1$) to open the corresponding pool hopper 10, whereby the articles contained by the pool hopper are released into the corresponding weighing hopper 12 (step $S_8$). Thus, all weighing hoppers 12, . . . 12 are supplied with articles to be weighed.

When the foregoing has been accomplished, an optimum combination is found in response to the next timing signal b ($b_2$ in FIG. 8) from the packaging apparatus 47 (steps $S_3$ through $S_6$). At this time, since both of the first and second flags F1, F2 are at the low (L) level, precedence is given to the first timing hopper 20a and the articles are to be introduced into the first collecting route 19a of the collecting chute 15. To this end, the weighing hoppers 12, . . . 12 corresponding to the selected optimum combination are opened in the proper manner, this being accomplished by the discharge control unit 44 which delivers the first discharge signal $d_1$ to the corresponding hopper gate actuating devices 13, . . . 13. As a result, the articles from the proper weighing hoppers are released into the first timing hopper 20a (steps $S_9$, $S_{10}$) At the same time, the first hopper flag F1, which indicates whether there are articles in the first timing hopper 20a, is set to the H level (step $S_{11}$), namely the level indicating the presence of the articles. Also, in order to supply those of the weighing hoppers 12, . . . 12 that have discharged their articles with articles for the next weighing cycle, the combinatorial computation control unit 43 delivers the supply signals c, . . . c ($c_2$ in FIG. 8) to the hopper gate actuating devices 13, . . . 13 so as to open the corresponding pool hoppers 10, . . . 10 (step $S_{12}$).

As articles are being supplied to these weighing hoppers 12, . . . 12, the control apparatus 42, in response to the next timing signal b ($b_3$ in FIG. 8) performs the next combinatorial computation, in accordance with the steps $S_3$ through $S_6$, with regard to the weighing hoppers 12, . . . 12 that have not yet discharged their articles. Since the first hopper flag F1 has been set to the high logic level in step $S_{11}$, the control apparatus 42 now produces the second discharge signal $d_2$ for introducing articles into the second collecting route 19b of the collecting chute 15 from the weighing hoppers 12, . . . 12 corresponding to the optimum combination (steps $S_9$ and $S_{13}$) The control apparatus 42 also sets the second hopper flag F2 to the high (H) level (step $S_{14}$). As a result, the articles are charged into the second timing hopper 20b from the second collecting route 19b. At the same time, the set signal f ($f_2$ in FIG. 8) is delivered to the first flip-flop 48a (step $S_{15}$) to actuate the first drive unit 22a, which responds by opening the gate 21a of the first timing hopper 20a. As a result, the articles introduced into the hopper 20a in step $S_{10}$ are discharged into the packaging apparatus 47. The control apparatus 42 then sends the discharge completion signal e ($e_1$ in FIG. 8) to the packaging apparatus 47 to inform the latter of the fact that the discharge operation has been completed (step $S_{16}$). In response, the packaging apparatus 47 packages the articles discharged by the firist timing hopper 20a. In the control apparatus 42 the first hopper flag F1 is reset to the low (L) level (step $S_{17}$). The first drive unit 22a remains in operation until the first flip-flop 48a receives the reset signal h ($h_2$ in FIG. 8) from the first photosensor 40a (differentiating circuit 41a) That is, once the gate of the first timing hopper 20a has been opened, the first drive unit 22a continues operating until the gate 21a is closed again.

As articles are being introduced into the second timing hopper 20b and discharged from the first timing hopper 20a into the packaging apparatus 47 as described hereinabove, the weighing hoppers 12, . . . 12 which have released their articles into the second timing hopper 20b are supplied with articles in response to the supply signals c, . . . c ($c_3$ in FIG. 8) (step $S_{12}$). This is followed by computing combinations again in response to the next timing signal b ($b_4$ in FIG. 8) (steps $S_3$ through $S_6$). Now, however, since the first hopper flag F1 is low (L) and the second hopper flag F2 is high, articles are introduced from the first collecting route 19a to the first timing hopper 20a in response to the first discharge signal $d_1$, and articles are discharged from the second timing hopper 20b into the packaging apparatus 47 in response to the set signal g ($g_2$ in FIG. 8) (steps $S_9$, $S_{18}$ through $S_{22}$)

Thereafter, the operating sequence composed of steps $S_3$–$S_6$, $S_9$, $S_{13}$–$S_{17}$ and $S_{12}$, and the operating sequence composed steps $S_3$–$S_6$, $S_9$, $S_{18}$–$S_{22}$ and $S_{12}$, are repeated alternately. In brief, therefore, as articles are being introduced from the weighing hoppers 12, . . . 12, which belong to the weighing machines 11, . . . 11 selected by the optimum combination, into one timing hopper 20a (or 20b) via one collecting route 19a (or 19b), the articles introduced into the other timing hopper 20b (or 20a) by the immediately preceding weighing cycle are discharged from the timing hopper into the packaging apparatus 47.

Processing proceeds as follows if a desired combination is not found during the repetition of the foregoing operating sequences. Specifically, let us assume that articles reside in the first timing hopper 20a and that, under such condition, an optimum combination of articles cannot be obtained for introduction into the second timing hopper 20b. When such is the case, combinations are computed in response to the timing signal b (b' in FIG. 8) in accordance with the steps $S_3$ through $S_5$. Now, however, there is a transition from step $S_6$ to step $S_7$, and the first hopper flag F1 is at the high (H) level. Therefore, the set signal f (f' in FIG. 8) is delivered to the first flipflop 48a (step $S_{23}$), so that the articles residing in the first timing hopper 20a are discharged into the packaging apparatus. The first hopper flag F1 is then reset to the L level (step $S_{24}$), the discharge completion signal e (e' in FIG. 8) is delivered to the packaging apparatus (step $S_{25}$), the packaging apparatus responds to this signal by packaging the articles, and the proper weighing hoppers are replenished with articles by the corresponding pool hoppers in response to the supply signals c, . . . c (c' in FIG. 8) (step $S_8$). In the present case, the second discharge signal $d_2$ for the discharge of articles from weighing hoppers to the second collecting route 19b is not produced, and no articles are charged into the second timing hopper 20b. Consequently, the second hopper flag F2, as well as the first hopper flag F1, attains the L level. Accordingly, when an optimum combination is obtained in accordance with the steps $S_3$ through $S_6$ by a combinatorial computation based on the next timing signal b (b" in FIG. 8), processing moves from step $S_9$ to the branch including steps $S_{10}$ and $S_{11}$, articles are charged into the first timing hopper 20a from the first collecting route 19a in response to the discharge signal $d_1$ ($d_1'$), and the first hopper flag F1 is set to the H level. Since there are no articles in the second timing hopper 20b, the second set signal g for opening the second timing hopper 20b is not produced, nor is the discharge completion signal e for acuating the packaging apparatus 47. This makes it possible to avoid a situation wherein the packaging apparatus 47 discharges an empty pack by performing a packaging operation despite the fact that no articles have been supplied to it from the timing hopper 20b. It should be noted that operation proceeds in a similar manner, in accordance with step $S_7$ and steps $S_{26}$ through $S_{28}$, when articles to be introduced from the first collecting route 19a to the first timing hopper 20a are not obtained.

Thus, as described hereinabove, the present invention pertains to an automatic weighing system of the combinatorial weighing type in which articles discharged from a plurality of weighing hoppers are introduced alternately into first and second collecting routes provided in a collecting chute. According to the invention, first and second timing hoppers are provided at the outlets of the first and second collecting routes, respectively, and first and second drive units are furnished for opening and closing the first and second timing hopper gates independently of each other, with operation proceeding in such a manner that when one of the hopper gates is opened, the other is closed without fail. Therefore, in supplying weighed out articles to, e.g., a packaging apparatus used in combination with the weighing system, the articles are temporarily retained in a timing hopper and then discharged, so that the articles can be supplied to the packaging apparatus at short intervals even if a prescribed amount of time, namely loss time, is required for the articles to slide downwardly through the collecting chute. This makes it possible to shorten waiting time, which is based on the loss time in the processing steps of the overall system. In particular, the arrangement is such that while articles are being introduced into one of the timing hoppers, articles are discharged into, e.g., the packaging apparatus from the other timing hopper, and such that the operations of resupplying the empty weighing hoppers and of computing combinations are performed simultaneously. This makes possible a great improvement in processing efficiency. Also, irrespective of the fact that the collecting chute has two discharge routes, the foregoing arrangement assures that articles will not be discharged from both routes simultaneously. This makes it possible to connect the weighing system to a single packaging-type high-speed packaging apparatus.

A second embodiment of the present invention will now be described. In this embodiment, the arrangement is such that the gate 21a (21b) of the timing hopper 20a (20b) operatively associated with the rotary shaft 23a (23b) of FIG. 1 is closed when the pulse signal is produced by the differentiating circuit 41a (41b) of FIG. 5.

Figure 9:
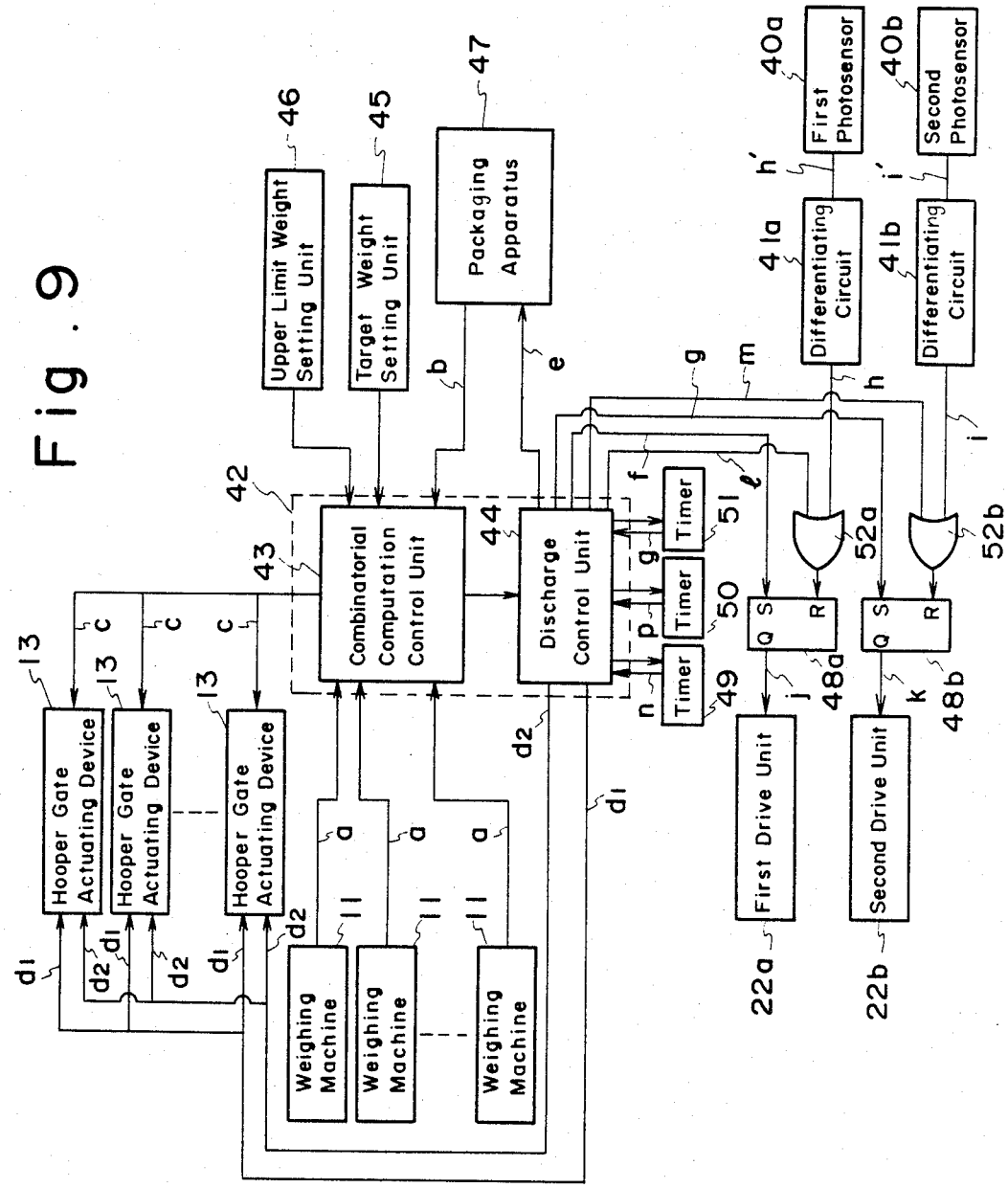
FIG. 9 is a block diagram of a second embodiment of the control apparatus.

The control apparatus 42 for controlling the weighing system main body 1 and the first and second drive units 22a, 22b, is as shown in FIG. 9. The control apparatus 42 comprises the combinatorial computation control unit 43 and the discharge control unit 44. Connected to the combinatorial control unit 43 is the target weight setting unit 45 and the upper limit weight setting unit 46. The combinatorial control unit 43 receives, as input signals, weight signals a, . . . a from the weighing machines 11, . . . 11 of the weighing system main body 1, and the timing signal b produced periodically by the packaging apparatus 47 used in combination with the weighing system. The combinatorial control unit 43 produces supply signals c, . . . c delivered to the hopper gate actuating devices 13, . . . 13 for opening the gates 10a, . . . 10a of the pool hoppers 10, . . . 10 corresponding to those weighing machines 11, . . . 11 which have been selected, as will be described below.

The discharge control unit 44 produces first and second control signals $d_1, \ldots d_1, d_2, \ldots d_2$ delivered to the hopper gate actuating devices 13, . . . 13 for opening the gates 12a, . . . 12a or 12b, . . . 12b of the selected weighing machines 11, . . . 11, as well as the signal e delivered to the packaging apparatus 47 to indicate the completion of a discharge operation. The first discharge signals $d_1, \ldots d_1$ open the gates corresponding to the first collecting route 19a of the weighing hoppers 12, . . . 12 belonging to the weighing machines 11, . . . 11. These are the gates corresponding to the outer and inner receiving portions 17a, 16b of the left and right sections 15a, 15b, respectively, of the collecting chute 15 shown in FIG. 1. The second discharge signals $d_2, \ldots d_2$ open the gates corresponding to the second collecting route 19b of the weighing hoppers 12, . . . 12. These are the gates corresponding to the inner and outer receiving portions 16a, 17b of the left and right sections 15a, 15b, respectively, of the collecting chute 15 shown in FIG. 1. The discharge control unit 44 also produces the setting signals f, g applied to the respective first and second flip-flop circuits 48a, 48b, as well as reset signals 1, m for the respective flip-flop circuits 48a, 48b. Applied to the discharge control unit 44 by first through third timers 49, 50, 51 are time-up signals n, p, q, respectively. The timers 49 through 51, which are pulse counting-type timers each having an internal clock pulse generator, produce the time-up signals n, p, q when each counts the clock pulses up to a preset value.

Figure 10:
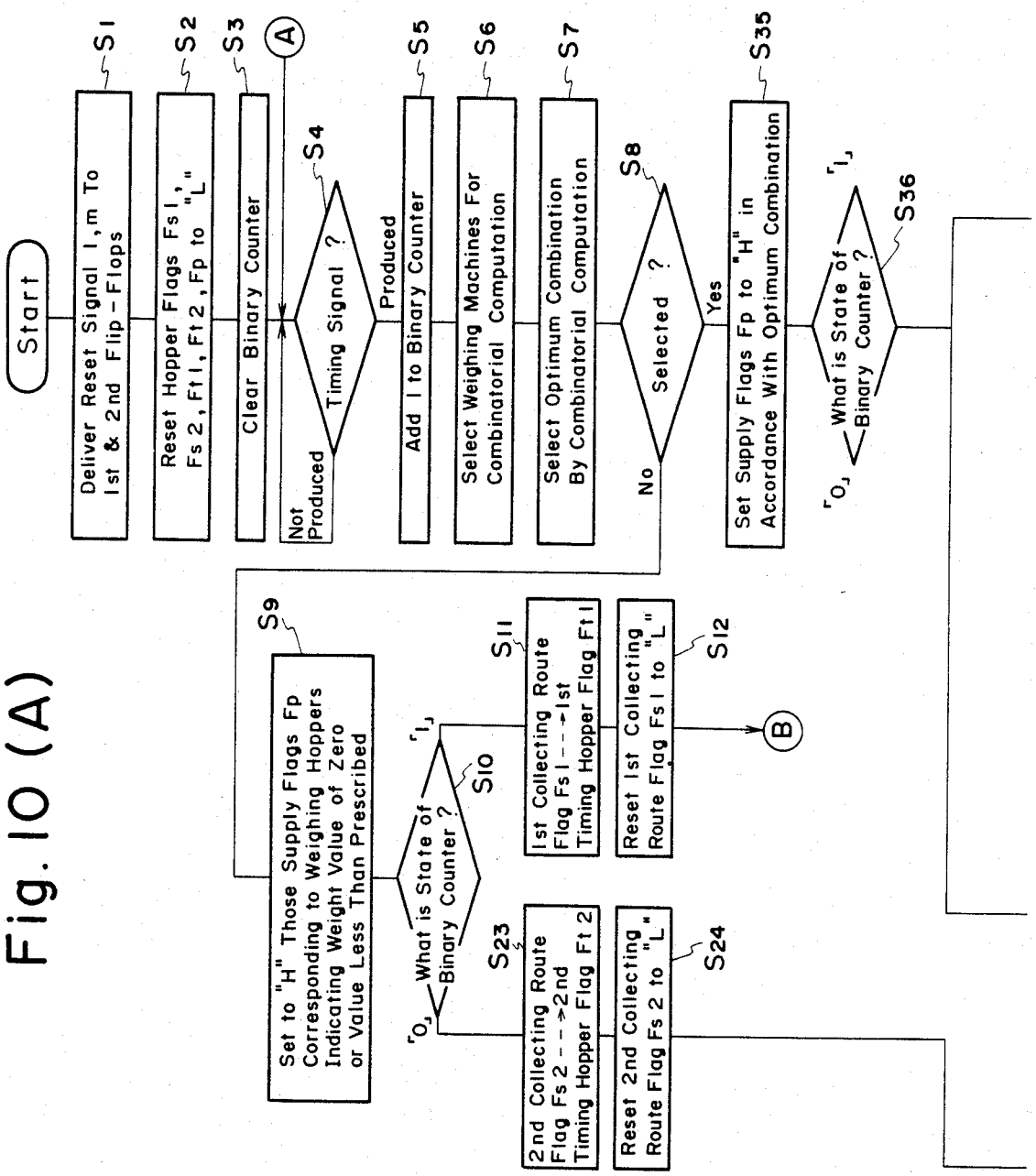
FIGS. 10 (including FIGS. 10(A) and 10(B)) and 11 are a flowchart timing chart, respectively, illustrating an article discharge operation according to the second embodiment.
Figure 10:
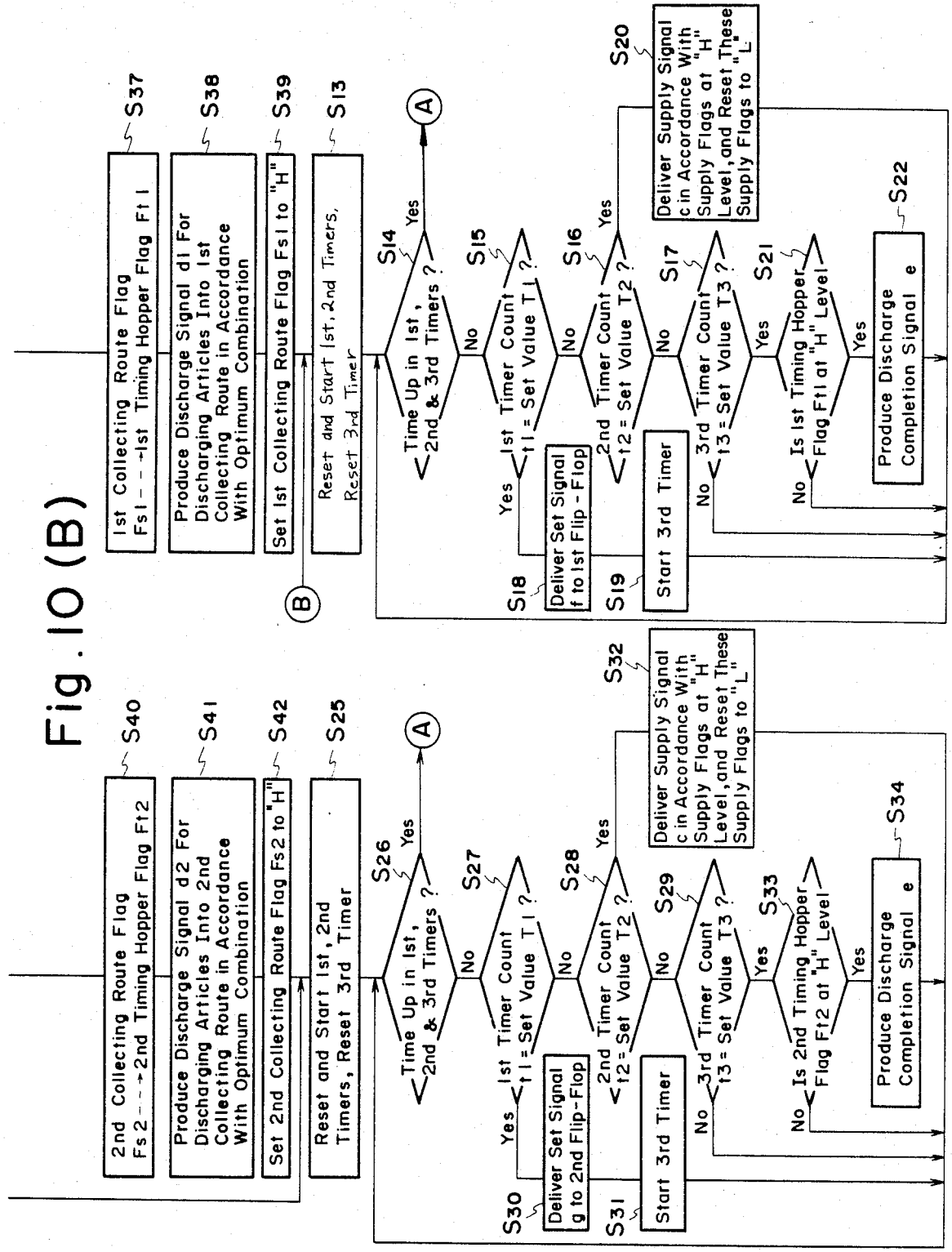

The operation of this embodiment of the present invention will now be described with reference to the flowchart of FIG. 10 and the timing chart of FIG. 11.

First, by introducing power, the discharge control unit 44 of the control apparatus delivers the reset signals 1, m to the first and second flip-flops 48a, 48b, respectively, so that the drive units 22a, 22b and, hence, the gates 21a, 21b of the first and second timing hoppers 20a, 20b, respectively, remain stationary. Also, first and second collecting route flags $Fs_1, Fs_2$, first and second timing hopper flags $Ft_1, Ft_2$, and all supply flags $F_p$, with which the discharge control unit 44 is provided, are reset to the low (L) logic level, and a binary counter C is cleared (steps $S_1$ through $S_3$ in FIG. 10). The first and second collecting route flags $Fs_1, Fs_2$ indicate whether articles are in the first and second collecting routes 19a, 19b, respectively, and the first and second timing hopper flags $Ft_1, Ft_2$ indicate whether articles are in the first and second timing hoppers 20a, 20b, respectively. A high (H) level for any flag indicates that the articles are present.

Next, when the packaging apparatus 47 delivers the timing signal b ($b_1$ in FIG. 11) to the combinatorial control unit 43, the signal is applied to the binary counter C to increment the counter to C="1". Also, the combinatorial computation control unit 43 computes combinations based on weight signals a, . . . a from preselected weighing machines 11, . . . 11 and in light of the numerical values set in the target weight setting unit 45 and upper limit weight setting unit 46 (steps $S_4$ through $S_7$). At this point in time, however, no articles are present in the weighing hoppers 12, . . . 12, so an optimum combination is not obtained. Accordingly, control moves from step $S_8$ to step $S_9$. In this step, the supply flags $F_p$ corresponding to those weighing hoppers 12, . . . 12 that give a weight value of zero or less than a prescribed value (in this case, all weighing hoppers inclusive of those which do not participate in the combinatorial computation) are set to the high (H) level. Since the state of the binary counter C is "1", the state of the first collecting route flag $Fs_1$ is shifted to the first timing hopper flag $Ft_1$, and the flag $Fs_1$ is reset to "L". (In this case, both flags $Fs_1$, $Fs_2$ are initially "L".) These operations take place in steps $S_{10}$ through $S_{12}$. Next, in step $S_{13}$, the first and second timers 49, 50 are reset and start counting, and the third timer 51 is reset.

Next, in steps $S_{14}$ through $S_{17}$, the state of the timers 49 and 50 is checked (timer 51 being nonoperational).

First, when the count $t_1$ in the first timer 49 attains a set value $T_1$, by way of example, the timer 49 delivers the time-up signal n to the discharge control unit 44, and the discharge control unit 44 delivers the set signal f ($f_1$ in FIG. 11) the first flip-flop circuit 48a (step $S_{18}$). The latter responds by applying the drive signal j to the first drive unit 22a, whereby the drive unit 22a is actuated to open the gate 22a of the first timing hopper 21a. At this time the third timer 51 starts counting (step $S_{19}$). When the count $t_2$ in the second timer 50 attains a set value $T_2$, the supply signals c, . . . c ($c_1$) are delivered to the hopper gate actuating devices 13, . . . 13, in accordance with the supply flags $F_p$ that are at the "H" level, in response to production of the time-up signal p. Thereafter, all supply flags $F_p$ are reset to "L" (step $S_{20}$). Owing to the operation of the hopper actuating devices 13, . . . 13, the gates 10a of the corresponding pool hoppers 10 are opened to supply the corresponding weighing hoppers 12, . . . 12 with articles. Since all of the supply flags $F_p$ were set to the high level in step $S_9$, all of the weighing hoppers 12, . . . 12 will be supplied with articles. When the count $t_3$ in the third timer 51, which started counting in step $S_{19}$, reaches a set value $T_3$ during the article supply operation and, hence, produces the time-up signal q, the state of the first timing hopper flag $Ft_1$ is checked in step $S_{21}$. Since the flag $Ft_1$ will be at the low logic level in this case, processing does not advance to step $S_{22}$ and, hence, the discharge completion signal e is not produced. The steps $S_{18}$, $S_{19}$, $S_{20}$, $S_{21}$ and $S_{22}$ are executed only once when the time expires in the corresponding timers 49, 50 and 51.

While the pool hoppers 10, . . . 10 are open for supplying the weighing hoppers 12, . . . 12 with articles, the operation performed by the control apparatus 42 returns from step $S_{14}$ to step $S_4$, and the next timing signal b ($b_2$ in FIG. 11) enters the control apparatus from the packaging apparatus 47. This is accompanied by applying a pulse to the binary counter C to establish the state C="0" (step $S_5$), followed by the combinatorial computation steps $S_6$, $S_7$. Since the articles have just been supplied to the weighing hoppers 12, . . . 12, the weighing machines 11, . . . 11 have not yet stabilized. In order to await the achievement of stabilization, an optimum combination is purposefully not obtained, and processing moves from step $S_8$ to steps $S_9$, $S_{10}$, $S_{23}$ and $S_{24}$. Thus, the state of the second collecting route flag $Fs_2$ is shifted to the second timing hopper flag $Ft_2$, and the flag $Fs_2$ is reset to "L". (Both flags $Fs_2$, $Ft_2$ are initially at the low logic level.) Since the weighing hoppers 12, . . . 12 were supplied with articles in step $S_{20}$, the supply flags $F_p$ are, under ordinary circumstances, not set in step $S_9$. Therefore, all supply flags $F_p$ remain at the "L" level. The timers 49, 50, 51 operate in accordance with steps $S_{25}$ through $S_{33}$, with operation proceeding as described above in connection with steps $S_{13}$ through $S_{21}$. The gate 21b of the second timing hopper 20b is opened in step $S_{30}$ by application of the set signal g (g' in FIG. 11) to the second flip-flop circuit 48b. In the event that any of the supply flags $F_p$ are at the "H" level, the supply signals c, . . . c ($c_2$ in FIG. 11) are delivered solely to the gate actuating devices 13 of the pool hoppers 10 corresponding to these high level supply flags, whereby the corresponding weighing hoppers 12 receive a supplemental supply of the articles All supply flags $F_p$ are then reset to "L" (step $S_{32}$).

Thenceforth, with the arrival of the next timing signal b ($b_3$ in FIG. 11), steps $S_4$ through $S_7$ are executed, so that the state of the binary counter C is raised to "1" and a combinatorial computation is carried out. If an optimum combination is found, then the supply flags $F_p$ corresponding thereto are set to "H" (steps $S_8$, $S_{35}$), and steps $S_{36}$ through $S_{39}$ are executed. That is, the first discharge signals $d_1$, . . . $d_1$ ($d_{11}$) are applied to the hopper gate actuating devices 13, . . . 13 for introducing articles into the first collecting route 19a from the weighing hoppers 12, . . . 12 corresponding to the optimum combination obtained, and the first collecting route flag $Fs_1$ is set to the "H" level to indicate that the articles have been introduced into the first collecting route 19a (steps $S_{38}$, $S_{39}$). The first timing hopper flag $Ft_1$, however, remains at the "L" level (step $S_{37}$). The timers 49, 50, 51 operate in accordance with steps $S_{13}$ through $S_{21}$, and the set signal f ($f_2$ in FIG. 11) is delivered to the first flip-flop circuit 48a upon passage of the time period $T_1$ measured from the production of the first discharge signal $d_{11}$ (step $S_{18}$). Upon passage of the time period $T_2$, which is also measured from the production of the first, discharge signal $d_{11}$, the supply signals c, . . . c ($c_3$ in FIG. 11) are produced for opening the pool hoppers 10, . . . 10 corresponding to the weighing hoppers 12, . . . 12 which have discharged their articles in conformance with the optimum combination. In other words, the supply signals are produced in accordance with the supply flags $F_p$ raised to the "H" level in step $S_{35}$. In this case, articles are introduced from the weighing hoppers 12, . . . 12 into the first collecting route 19a in response to the discharge signal $d_{11}$, and the first timing hopper 20a, which corresponds to the collecting route 19a, is opened in response to the set signal $f_2$. However, since this takes place before the articles reach the timing hopper 20a the articles are not discharged from the hopper 20a.

When the first release of articles from the plurality of the weighing hoppers 12, . . . 12 is performed as described above, steps $S_4$ through $S_7$ are executed in response to the next timing signal b ($b_4$ in FIG. 11) for carrying out a combinatorial computation again, this time with regard to those weighing machines 11, . . . 11 that did not release their articles (i.e., weighing machines that did not participate in the preceding combinatorial computation, and weighing machines that did participate but did not correspond to the optimum combination). The supply flags $F_p$ are set to the "H" level in accordance with the optimum combination obtained and, in accordance with the count ("0") in the binary counter C, the weighing hoppers 12, . . . 12, responsive to the second discharge signal $d_2$ ($d_{21}$ in FIG. 11), release their articles into the second collecting route 19b. In addition, the second collecting route flag $Fs_2$ is set to the "H" level. These operations take place in steps $S_{35}$, $S_{36}$ and $S_{40}$ through $S_{42}$. Then, the timers 49, 50, 51 operate in accordance with steps $S_{25}$ through $S_{33}$, the second timing hopper 20b is opened in response to the set signal g ($g_2$ in FIG. 11) (step $S_{30}$), the weighing hoppers 12, . . . 12 which have discharged their articles are supplied with articles from the pool hoppers 10, . . . 10 in response to the supply signals c, . . . c ($c_4$ in FIG. 11), and all of the supply flags $F_p$ are reset (step $S_{32}$). In this case, however, articles are not discharged from the second timing hopper 20b.

When a combinatorial computation is performed in response to the next timing signal b ($b_5$ in FIG. 11), articles are again released into the first collecting route 19a from the weighing hoppers 12, . . . 12 corresponding to the optimum combination in response to the first discharge signals $d_{11}$, . . . $d_{11}$ ($d_{12}$ in FIG. 11). The operations performed correspond to steps $S_{36}$ through $S_{39}$, and $S_{13}$ through $S_{22}$. It should be noted that the "H" level of the first collecting route flag $Fs_1$ is shifted to the first timing hopper flag $Ft_1$ by step $S_{37}$ in the present case. This indicates that the articles previously released into the first collecting route 19a have reached the first timing hopper 20a, this taking place at the moment the present batch of articles is released into this same collecting route 19a. In step $S_{18}$, the first timing hopper, 20a is opened in response to the set signal f ($f_3$ in FIG. 11) produced upon passage of the time period $T_1$ measured from the production of the first discharge signal $d_{12}$, namely from the instant at which the articles begin to be released from the weighing hoppers 12, . . . 12 into the first collecting route 19a. Hence, the articles previously released into the first discharge route 19a are discharged into the packaging apparatus from the first timing hopper 20a. Since the first timing hopper flag $Ft_1$ was set to the "H" level in step $S_{37}$, the discharge completion signal e ($e_1$ in FIG. 11) is delivered to the packaging apparatus 47 upon passage of the time period $t_3$, the packaging apparatus 47 responding to the signal by packaging the articles discharged from the first timing hopper 20a.

Thenceforth, and in a similar manner, articles are released from the weighing hoppers 12, . . . 12 into the first and second, collecting routes 19a, 19b alternately. When the articles are released into a collecting route, the articles previously released into the route are discharged into the packaging apparatus by opening the corresponding timing hopper after the current release has started but before the currently released articles reach the timing hopper. As a result, the interval between discharges of articles into the packaging apparatus can be made much shorter in comparison with the above-described arrangement; wherein one timing hopper is opened after waiting for the articles to reach the timing hopper from the corresponding collecting route, followed by releasing articles into the other collecting route when the first-mentioned articles are discharged from the one timing hopper.

Processing proceeds as follows if an optimum combination is not found during the repetition of the foregoing operating sequences. Specifically, after steps $S_4$ through $S_7$ are executed in response to the timing signal b (b' in FIG. 11), processing shifts from step $S_8$ to step $S_9$. For example, if the count in the binary counter C is "0" and the second collecting route flag $Fs_2$ is "H", the second timing hopper flag $Ft_2$ is set to the "H" level, and the second collecting route flag $Fs_2$ is set to the "L" level (steps $S_{23}$, $S_{24}$). Therefore, the discharge signal (the second discharge signal $d_2$ in this case) is not produced, i.e., articles are not released into from the weighing hoppers 12, . . . 12 into the collecting route 19b, and the timers 49, 50, 51 are operated in accordance with steps $S_{25}$ through $S_{34}$. Since the articles previously released will be present in the second timing hopper 20b in this case, the hopper 20b discharges the articles in response to the set signal g (g' in FIG. 11), and the discharge completion signal e (e' in FIG. 11) is produced (steps $S_{30}$, $S_{33}$, $S_{34}$). Then, in step $S_9$, the supply signals c, . . . c (c' in FIG. 11) are produced in accordance with the supply flags $F_p$ set to the "H" level, whereby the prescribed weighing hoppers 12, . . . 12 are supplemented with additional articles.

Next, in response to the timing signal b (b'' in FIG. 11), a combinatorial computation is performed with regard to those weighing hoppers 12, . . . 12 not supplemented. When an optimum combination is obtained, articles are released into the first collecting route 19a, and articles are discharged from the first timing hopper 20a, these operations taking place in normal fashion in accordance with steps $S_{35}$ through $S_{39}$, and $S_{13}$ through $S_{22}$. Then, when a combinatorial computation is performed based on the next timing signal b (b''' in FIG. 11), an optimum combination is obtained and control is again carried out with respect to the second collecting route 19b in accordance with steps $S_{40}$ through $S_{42}$ and $S_{25}$ through $S_{33}$, so that articles are released from the weighing hoppers 12, . . . 12 into the collecting route 19b in response to the discharge signal $d_2$ ($d2'$ in FIG. 11) (step $S_{41}$). However, since no articles were released in the previous cycle, articles are not discharged into the packaging apparatus even though the second timing hopper 20b is opened in response to the set signal g (g'' in FIG. 11) produced in step $S_{30}$. The discharge completion signal e is not produced at this time because the second timing hopper flag $Ft_2$ was shifted to the "L" level in step $S_{40}$. Thus, the packaging apparatus will not attempt to package articles that have not been supplied.

It should be noted that the supply troughs 9 are operated automatically for a prescribed length of time when the gates 10a of the corresponding pool hoppers 10 are actuated, thereby to supply these pool hoppers 10 with articles. Accordingly, though the invention has been described on the assumption that all of the pool hoppers 10, . . . 10 contain a supply of the articles following the introduction of power, in actuality the steps $S_4$ through $S_{21}$, $S_4$ through $S_{10}$, and $S_{23}$ through $S_{33}$ are executed a plurality of times following the introduction of power. This allows all pool hoppers 10, . . . 10 to be supplied with articles from the corresponding supply troughs 9, . . . 9.

Figure 11:
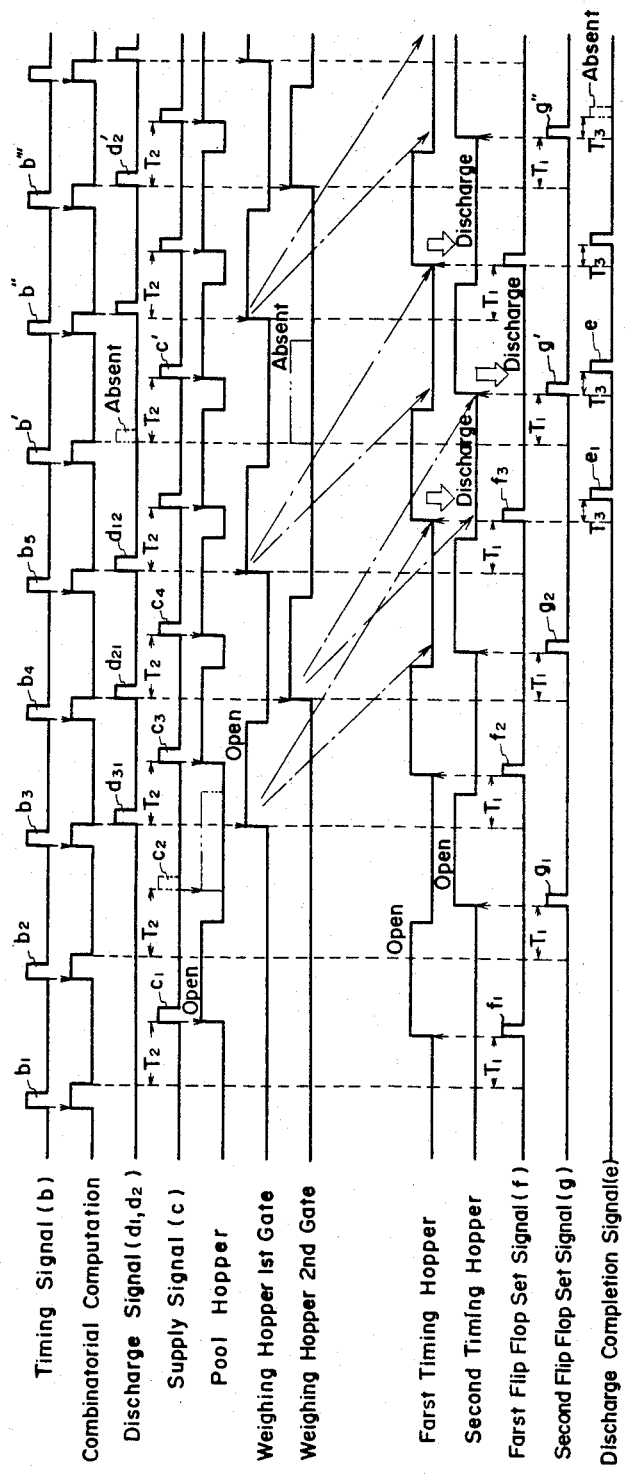

According to the above-described arrangement, it is obvious from FIG. 11 that articles can be released into one collecting route before articles released into the other collecting route arrive at the corresponding timing hopper. In addition, with regard to each timing hopper, articles can be released and discharged without requiring waiting time, as by discharging articles and then closing the corresponding timing hopper gate, followed immediately by releasing the next batch of articles and then beginning a discharge operation right after this release of the articles is completed. Moreover, by performing these operations alternately between the first and second timing hoppers, it is possible to greatly reduce the interval between discharges into the packaging apparatus.

Where the weighed articles exhibit an excellent sliding property with respect to the collecting chute (e.g., articles such as beans or grains having a high specific gravity and a low frictional resistance), or where the articles discharged into the collecting chute from each weighing hopper have a low total weight, less time is required for these articles to reach the timing hopper once they have been discharged from the weighing hoppers. Therefore, the period of the timing signal produced by the packaging apparatus, as well as the period of the time-up signals produced by the timers, may be shortened. As a result, when the articles are released into, for example the first collecting route 19a, the articles previously released into this route can, as described above, be discharged into the packaging apparatus by opening the first timing hopper 20a after the current release has started but before the currently released articles reach the timing hopper 20a. Moreover, when articles are released into the second collecting route 19b, the articles previously released into the second collecting route 19b can be discharged into the packaging apparatus immediately after the articles from the first timing hopper 20a by opening the second timing hopper 20b after the current release into the second collecting route 19b has started but before the articles currently released into the route 19b reach the second timing hopper, and before the first timing hopper 20a closes completely. In other words, by discharging articles into the packaging apparatus alternately from the two timing hoppers by opening one timing hopper before the other closes, the interval between discharges into the packaging apparatus can be shortened to an even greater extent.

In accordance with the present invention as embodied hereinabove, wherein an automatic weighing system and a packaging apparatus are employed in combination, articles can be supplied from the former to the latter intermittently and at an extremely short discharge interval. Accordingly, even if the weighing system is used in conjuction with a packaging apparatus having but a single processing system, the capability of the packaging apparatus can be exploited to the maximum degree. This makes it possible to raise the speed and efficiency of the overall weighing and packaging operation.

As many apparently widely different embodiments of the present invention can be made without departing from the spirit and scope thereof, it is to be understood that the invention is not limited to the specific embodiments thereof except as defined in the appended claims.

What we claim is:

1. An apparatus for discharging weighed articles in an automatic weighing system having a plurality of weighing hoppers and a collecting chute for collecting and discharging weighed articles released from the weighing hoppers, the collecting chute being provided with first and second collecting routes having first and second outlets, respectively, the weighed articles being released selectively into the first and second collecting routes, said apparatus comprising:
   a pair of timing hoppers respectively provided at the first and second outlets of the first and second collecting routes;
   first and second drive means, respectively coupled to said timing hoppers, for being selectively controlled to open and close said timing hoppers; and
   control means for controlling said first and second drive means, when weighed articles are released from the weighing hoppers into one of the first and second collecting routes, to control said timing hopper corresponding to the one of the first and second collecting routes in such a manner that weighed articles previously released into the timing hopper are discharged completely during the time needed for the weighed articles just released to reach said timing hopper via the one of the first and second collecting routes.

2. The apparatus according to claim 1, wherein said control means includes means for controlling said first and second drive means to open said one timing hopper by the time the other hopper closes upon discharging articles therefrom.

3. The apparatus according to claim 2, wherein said control means includes:
   means for selecting weighed articles to be released into one of the first and second collecting routes from weighing hoppers by a combinatorial computation; and
   means for selecting a subsequent combination from among the remaining weighing hoppers and for controlling weighed articles released into the other of the first and second collecting routes from the weighing hoppers selected in the subsequent combination during the time needed for the weighed articles just released to reach the timing hopper corresponding to the one of the first and second collecting routes, via the one of the first and second collecting routes.

4. The apparatus according to claim 1, wherein said control means includes:
   means for selecting weighed articles to be released into one of the first and second collecting routes from weighing hoppers by a combinatorial computation; and
   means for selecting a subsequent combination from among the remaining weighing hoppers and for controlling weighed articles to be released into the other of the first and second collecting routes from the weighing hoppers selected in the subsequent combination during the time needed for the weighed articles just released to reach the timing hopper corresponding to the one of the first and second collecting routes, via the one of the first and second collecting routes.

5. A method of discharging weighed articles in an automatic weighing system, wherein weighed articles are collected and discharged by selectively introducing the weighed articles, released from a plurality of weighing hoppers, into first and second collecting routes of a collecting chute, said method comprising the steps of:
   (a) temporarily gathering weighed articles at outlets of respective ones of the first and second collecting routes; and
   (b) selectively discharging the weighed articles from one of the outlets once the weighed articles have been gathered at the outlet, so that when weighed articles are released into one of the first and second collecting routes of the collecting chute from weighing hoppers selected by a combinatorial computation, said step (b) includes a step of discharging weighed articles previously gathered at the outlet corresponding to the one of the first and second collecting routes during the time needed for the weighed articles just released to reach the outlet via the one of the first and second collecting routes.

6. The method according to claim 5, wherein after weighed articles are discharged from one of the outlets, said step (b) includes a step of beginning to discharge weighed articles from the other outlet during the time needed for the weighed articles just released to reach the one of the outlets via the one of the first and second collecting routes.

7. The method according to claim 5, wherein after weighed articles are released into one of the first and second collecting routes from weighing hoppers selected by a combinatorial computation, said step (b) includes steps of:
 (i) selecting a subsequent combination from among the remaining weighing hoppers during the time needed for the weighed articles just released to reach the outlet corresponding to the one of the first and second collecting routes; and
 (ii) starting to release weighed articles into the other of the first and second collecting routes from weighing hoppers selected by said subsequent combination in said step (i).

8. The method according to claim 6, wherein after weighed articles are released into one of the first and second collecting routes from weighing hoppers selected by a combinatorial computation, said step (b) includes steps of:
 (i) selecting a subsequent combination from among the remaining weighing hoppers during the time needed for the weighed articles just released to reach the outlet corresponding to the one of the first and second collecting routes; and
 (ii) starting to release weighed articles into the other of the first and second collecting routes from weighing hoppers selected by said subsequent combination in said step (i).

9. A method of discharging batches of articles, comprising the steps of:
 (a) releasing articles to be collected to form a first batch of articles along a first collecting route having an outlet;
 (b) gathering the articles forming the first batch of articles by receiving the articles at the outlet of the first collecting route;
 (c) releasing articles to be collected to form a second batch of articles along a second collecting route having an outlet;
 (d) gathering articles forming the second batch of articles by receiving the articles released at the outlet of the second collecting route;
 (e) alternately discharging the first and second batches of articles gathered in said steps (b) and (d), the first batch of articles being discharged while performing said step (a) substantially simultaneously to form a new first batch of articles, so that said discharging step (e) is completed before the articles released in said step (a) are gathered at the outlet of the first collecting route in said step (b).

10. The method according to claim 9, wherein after the first batch is discharged in said step (e), the second batch gathered at the outlet of the second collecting route is discharged in said step (e) while performing said step (c) substantially simultaneously to form a new second batch of articles, and while a new first batch is being gathered in said step (b), so that said discharging step is completed before the articles released in said step (c) are gathered at the outlet of the second collecting route in said step (d).

* * * * *

UNITED STATES PATENT AND TRADEMARK OFFICE
CERTIFICATE OF CORRECTION

PATENT NO. : 4,535,855
DATED : AUGUST 20, 1985
INVENTOR(S) : ASASHIRO IZUMI ET AL.

It is certified that error appears in the above-identified patent and that said Letters Patent is hereby corrected as shown below:

Col. 4, line 18, "15b," (first occurrence) should be --15a,--;
line 22, "15b," (first occurrence) should be --15a,--.

Col. 6, line 6, "15b," (first occurrence) should be --15a,--.

Col. 13, line 52, "arrangement;" should be --arrangement,--.

Col. 16, line 12, "other hopper" should be --other timing hopper--.

[SEAL]

Signed and Sealed this

Third Day of December 1985

Attest:

DONALD J. QUIGG

Attesting Officer

Commissioner of Patents and Trademarks